March 1, 1960
R. E. BRICKER
2,926,471
STOPPING A ROTATING MEMBER IN A
PREDETERMINED ANGULAR POSITION
Filed Feb. 21, 1957
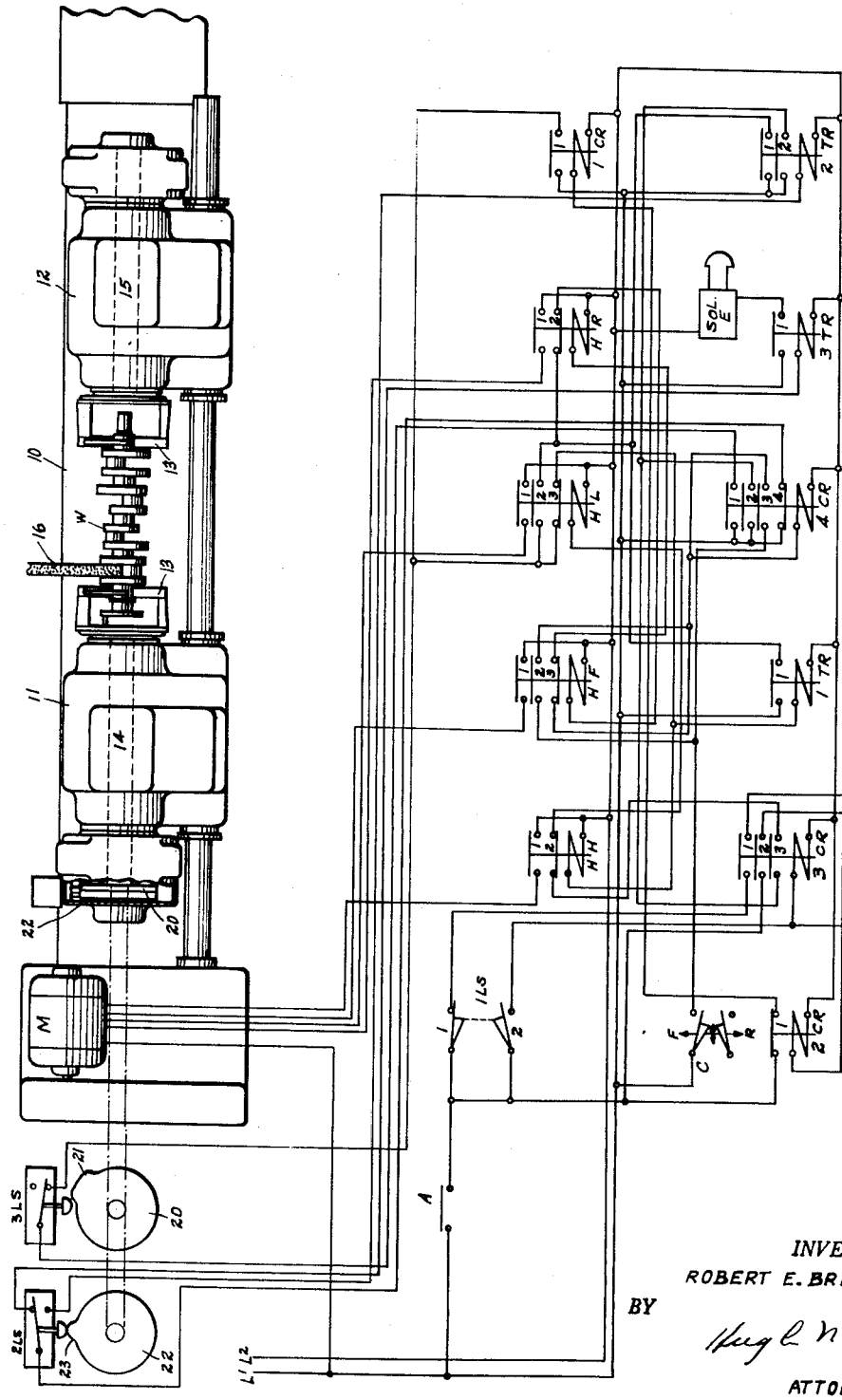
INVENTOR.
ROBERT E. BRICKER
BY
ATTORNEY

United States Patent Office

2,926,471
Patented Mar. 1, 1960

2,926,471

STOPPING A ROTATING MEMBER IN A PREDETERMINED ANGULAR POSITION

Robert E. Bricker, Waynesboro, Pa., assignor to Landis Tool Company, Waynesboro, Pa.

Application February 21, 1957, Serial No. 641,604

10 Claims. (Cl. 51—237)

This invention relates to grinding machines or other machine tools in which it is desirable to stop rotation of a workpiece or some part of the machine in a predetermined position.

Devices of this type are used on machines such as crankpin grinders where the crank clamping fixture must stop in a predetermined angular position to facilitate the loading or removal of finished pieces. If workpieces are loaded or unloaded by hand, the crank headstock spindle may stop slightly to one side or the other of the predetermined position. If the spindle stops too far out of position, the operator can jog the motor until the position is reached. However, when loading and unloading is performed automatically, the headstock must stop in exact position for operation of the loader.

It is therefore an object of this invention to provide means for stopping the headstock spindle in predetermined angular positon.

Another object is to provide means for automatically resuming headstock rotation if the spindle stops either ahead of or behind the proper position.

The drawing is an electric circuit for the work driving motor of a crank grinding machine.

Numeral 10 indicates the work carriage of a crank grinder. 11 and 12 are crank heads having work clamping fixtures 13 rotatably mounted on spindles 14 and 15 in said heads respectively. Work rotation is effected by a motor M operating through suitable transmitting elements of the type disclosed in Patent 1,816,750, granted July 28, 1931. On the end of spindle 14 are a pair of cams 20 and 22. Cam 20 has a relatively long nose 21 to actuate tappet switch 3LS. Cam 22 has a relatively short nose 23 to actuate limit switch 2LS. Said cams 20 and 22 are mounted on spindle 14 for angular adjustment relative to one another.

The function of cam 20 is to stop motor M with the clamping fixtures 13 in a predetermined angular position. The function of cam 22 is to determine whether said clamps 13 are in the desired position. If they are in the proper position, limit switch 2LS acts to initiate the functions which occur at the end of the machining cycle. If the clamping fixtures 13 stop behind or ahead of the desired position, limit switch 2LS which is a snap switch will remain in or will return to its normal position and will cause the crank head to resume rotation at slow speed until it is again stopped by cam 20 and tappet switch 3LS.

Operation

In a motor control device of the type described, it is desirable that certain operations be completed before motor M is started. The last operation to be completed starts the motor M. In this case, an electric contact A is indicated as being closed when all the required conditions have been met. This contact completes a circuit through normally closed relay contact 2CR1 to energize relay 1CR. Relay contact 1CR1 completes a circuit through normally closed low speed relay contact HL3 to energize high speed relay HH and timer relay 1TR. Timer relay contact 1TR1 completes a circuit through normally closed reverse speed relay contact HR2 to energize forward speed relay HF. Forward speed relay contact HF1 closes a circuit from line L2 through motor M to line L1 which starts the motor M forward at high speed. When motor M starts, the zero speed switch C closes a circuit through forward speed relay contact HF2 to energize relay 4CR. Relay contact 4CR3 closes a holding circuit around forward speed relay contact HF2.

After motor M has started, grinding wheel 16 or other cutting tool may be advanced either manually or in response to the starting of motor M. In the advance position of the cutting tool, limit switch contact 1LS1 is open and limit switch contact 1LS2 is closed. Limit switch contact 1LS2 completes a circuit to energize relay 3CR. Relay contact 3CR2 provides a holding circuit around limit switch contact 1LS2. Relay contact 3CR1 closes a circuit to relay 2CR, but relay 2CR is not energized until limit switch contact 1LS1 in the same circuit is closed upon the retraction of grinding wheel 16.

At the end of the grinding cycle, grinding wheel 16 is retracted either manually or automatically, closing limit switch contact 1LS1 and opening limit switch contact 1LS2. Opening limit switch contact 1LS2 does not affect relay 3CR which is held by relay contact 3CR2. Closing limit switch contact 1LS1 completes a circuit through relay contact 3CR1 to energize relay 2CR. Normally closed relay contact 2CR1 in the circuit to relay 1CR opens, deenergizing relay 1CR. Relay contact 1CR1 opens the circuit through normally closed low speed relay contact HL3 to high speed relay HH and timer relay 1TR, but high speed relay HH and timer relay 1TR are held through tappet switch 3LS and relay contact 4CR1 until cam 20 on spindle 14 opens the tappet switch 3LS and the circuit to high speed relay HH and timer relay 1TR. Normally closed high speed relay contact HH2 completes a circuit from relay contact 4CR2 through relay contact 3CR3 to low speed relay HL, changing the driving motor M to slow speed. Thus, when high speed relay contact HH1 opens, high speed relay contact HH2 closes to complete a circuit from relay contact 4CR2 through relay contact 3CR3 to energize low speed relay HL. Low speed relay contact HL1 closes, changing the motor M connection from high speed to low speed. High speed relay HH is energized through a normally closed contact of low speed relay HL which, in turn, is energized through a normally closed contact of high speed relay HH, so that the two relays cannot be energized simultaneously.

Timer relay contact 1TR1 maintains a circuit through normally closed reverse speed relay contact HR2 to forward speed relay HF during the inerval when tappet switch 3LS is open so that the change from high speed to low speed can be effected without stopping motor M. Timer relay 1TR then times out and the next time tappet switch 3LS is opened, forward speed relay HF is deenergized, closing forward speed relay contact HF3 to energize reverse speed relay HR. Reverse speed relay contact HR1 closes the circuit to the reverse connection on motor M to reverse said motor. As soon as motor M stops and before it reverses, zero speed switch C opens and deenergizes reverse speed relay HR allowing motor M to stop. Opening zero speed switch C also deenergizes relay 4CR, closing relay contact 4CR4.

If spindle 14 is in proper unload position, unload cam 22 will actuate unload limit switch 2LS to complete a circuit through its upper conatct from normally closed relay contact 4CR4 to energize timer relay 3TR. Timer relay contact 3TR1 energizes clamp solenoid E, opening the work clamps 13 and initiating any other functions which occur at the end of the grinding cycle.

If spindle 14 is not in the right position for unloading, the lower contact of limit switch 2LS will be allowed to remain in position to complete a circuit from relay contact 4CR4 to timer relay 2TR. After a predetermined interval to be sure that the crank head 11 is stopped, timer relay contact 2TR1 will energize forward speed relay HF through reverse speed relay contact HR2, and timer relay contact 2TR2 will energize low speed relay HL through relay contact 3CR3 and high speed relay contact HH2 to start motor M again at low speed. When motor M is started again at low speed, normally open relay contact 4CR2 and normally closed relay contact 4CR4 overlap, so that when relay 4CR is energized by the closing of the zero speed switch C, relay contact 4CR2 will close before relay contact 4CR4 opens, so that the by-pass circuit from relay contact 4CR2 through relay contact 3CR3 and high speed relay contact HH2 to low speed relay HL will be closed before the parallel circuit through timer relay contact 2TR2 is opened by the opening of relay contact 4CR4 and the resultant deenergizing and opening of timer relay 2TR. Motor M completes a revolution at low speed and the stopping procedure is repeated until motor M stops with spindle 14 in the desired position.

I claim:

1. In a machine tool, a spindle, a motor for driving said spindle, a switch for closing a circuit to said motor, a second switch in parallel with said first switch whereby to continue operation of said motor after opening said first switch, means on said spindle for opening said second switch when said spindle is in a predetermined position, means on said spindle for determining whether said spindle has stopped in the desired position, and selective means actuable by said means on said spindle to conclude the machining cycle or to resume rotation of the spindle and repeat the stopping process until the spindle stops in the desired position.

2. In a machine tool, a spindle, a motor for driving said spindle, a switch for closing a circuit to said motor, a second switch in parallel with said first switch whereby to continue operation of said motor after opening said first switch, means on said spindle for opening said second switch when said spindle is in a predetermined position, means on said spindle for determining whether said spindle has stopped in the desired position including a switch which is operable if said spindle is in said desired position to complete a circuit effective to end the machining cycle.

3. In a machine tool, a spindle, a motor for driving said spindle, a switch for closing a circuit to said motor, a second switch in parallel with said first switch whereby to continue operation of said motor after opening said first switch, means on said spindle for opening said second switch when said spindle is in a predetermined position, means on said spindle for determining whether said spindle has stopped in the desired position including a switch which is operable if said spindle is not in said desired position to resume rotation of said spindle for one revolution to repeat the opening of said first switch and the subsequent stopping procedure until the spindle stops in the desired position.

4. In a machine tool, a spindle, a motor for driving said spindle, a switch for closing a circuit to said motor, a second switch in parallel with said first switch whereby to continue operation of said motor after opening said first switch, means on said spindle for opening said second switch once every revolution of the spindle, and means for by-passing said second switch for a predetermined interval.

5. In a machine tool, a spindle, a motor for driving said spindle, a switch for closing a circuit to said motor, a second switch in parallel with said first switch whereby to continue operation of said motor after opening said first switch, means on said spindle for opening said second switch once every revolution of said spindle, and means for by-passing said second switch including a time switch to maintain a circuit to said motor while said switch is open.

6. In a machine tool, a spindle, a motor for driving said spindle, a switch for opening a circuit to said motor, a second circuit parallel to said first circuit whereby to continue operation of said motor after opening said switch, a switch in said second circuit, means on said spindle for actuating said switch in said second circuit to stop said motor, a second means on said spindle for determining whether said spindle has stopped in the desired position, and a selector switch operable by said second means to initiate functions which occur at the end of a machining cycle.

7. In a machine tool, a spindle, a motor for driving said spindle, a switch for opening a circuit to said motor, a second circuit parallel to said first circuit whereby to continue operation of said motor after opening said switch, a switch in said second circuit, means on said spindle for actuating said switch in said second circuit to stop said motor, a second means on said spindle for determining whether said spindle has stopped in the desired position, and a selector switch operable by said second means only after said motor has stopped, to initiate functions which occur at the end of a machining cycle.

8. In a machine tool, a spindle, a motor for driving said spindle, a switch for opening a circuit to said motor, a second circuit parallel to said first circuit whereby to continue operation of said motor after opening said switch, a switch in said second circuit, means on said spindle for actuating said switch in said second circuit to stop said motor, a second means on said spindle for determining whether said spindle has stopped in the desired position, and a selector switch operable by said second means only after said motor has stopped with said spindle in said desired position, to initiate functions which occur at the end of a machining cycle.

9. In a machine tool, a spindle, a motor for driving said spindle, a switch for opening a circuit to said motor, a second circuit parallel to said first circuit whereby to continue operation of said motor after opening said switch, a switch in said second circuit, means on said spindle for actuating said switch in said second circuit to stop said motor, a second means on said spindle for determining whether said spindle has stopped in the desired position, and a selector switch operable by said second means only after said motor has stopped and only when said spindle is in said desired position, to initiate functions which occur at the end of a machining cycle.

10. In a machine tool, a spindle, a motor for driving said spindle, a switch for opening a circuit to said motor, a second circuit parallel to said first circuit whereby to continue operation of said motor after opening said switch, a switch in said second circuit, means on said spindle for actuating said switch in said second circuit to stop said motor, a second means on said spindle for determining whether said spindle has stopped in the desired position, and a selector switch operable by said second means only after said motor has stopped, a relay having a normally closed contact in the circuit to said selector switch, a zero speed switch in the circuit to said relay, said zero speed switch being connected to said motor and operable when said motor stops to open said circuit and deenergize said relay whereby said normally closed contact connects said selector switch to a source of current.

References Cited in the file of this patent

UNITED STATES PATENTS

| | | |
|---|---|---|
| 2,780,895 | Silven et al. | Feb. 12, 1957 |
| 2,790,280 | Wilson et al. | Apr. 30, 1957 |